A. FRANK.
METER.
APPLICATION FILED AUG. 31, 1909.

1,024,886.

Patented Apr. 30, 1912.

Witnesses:
Alfred Lyons.
Julian T. Marks.

Inventor:
Adolph Frank
by L. K. Böhm,
Attorney.

UNITED STATES PATENT OFFICE.

ADOLPH FRANK, OF CHARLOTTENBURG, GERMANY.

METER.

1,024,886.   Specification of Letters Patent.   Patented Apr. 30, 1912.

Application filed August 31, 1909. Serial No. 515,415.

*To all whom it may concern:*

Be it known that I, ADOLPH FRANK, a subject of the King of Prussia, and resident of Charlottenburg, near Berlin, Germany, have invented new and useful Improvements in Meters, of which the following is a specification.

This invention has reference to meters for registering the number of units such as electric units, cubic feet of gas, water or the like and also the value of the units used. Such meters usually have the unit scale and all the working parts inclosed in a sealed case, so as to prevent the customer from opening the meter and tampering with its mechanism. The use of a value scale on such meter is consequently very small and does not permit of a ready control of the consumption by the customer.

It is the object of the present invention to provide means whereby the customer may readily determine himself the daily or the weekly consumption and value of units used or he may control the difference between the normal consumption and value of units with any excess of, say the electric current used by servants and subordinates during his absence. Thus any reckless and wasteful use by careless servants and the like may be controlled and checked.

All the gas meters and electric meters in use are standardized by the authorities or the producer of gas and electricity or by both. The construction of the meters therefore is such that the mechanism can not be reached because a lead seal that can not or that must not be opened is provided thereon. If the consumer now desires to control the consumption and value of units as above outlined means must be provided which do not require the opening of the seal of a meter standardized by the authorities but such means must be applicable without tampering with the standardized meter in any manner or form.

The invention will be more readily understood from the following description of one suitable form of the present invention herein illustrated as applied to a gas meter.

Figure 1:
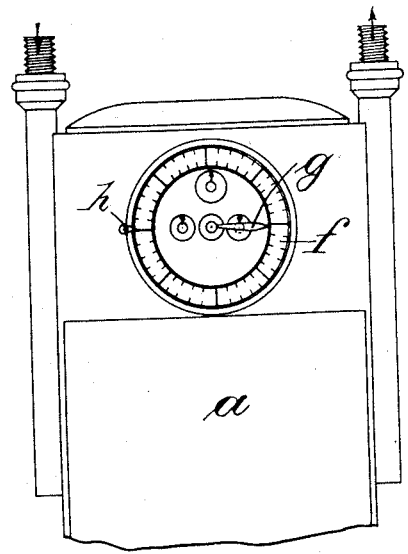
Figure 2:
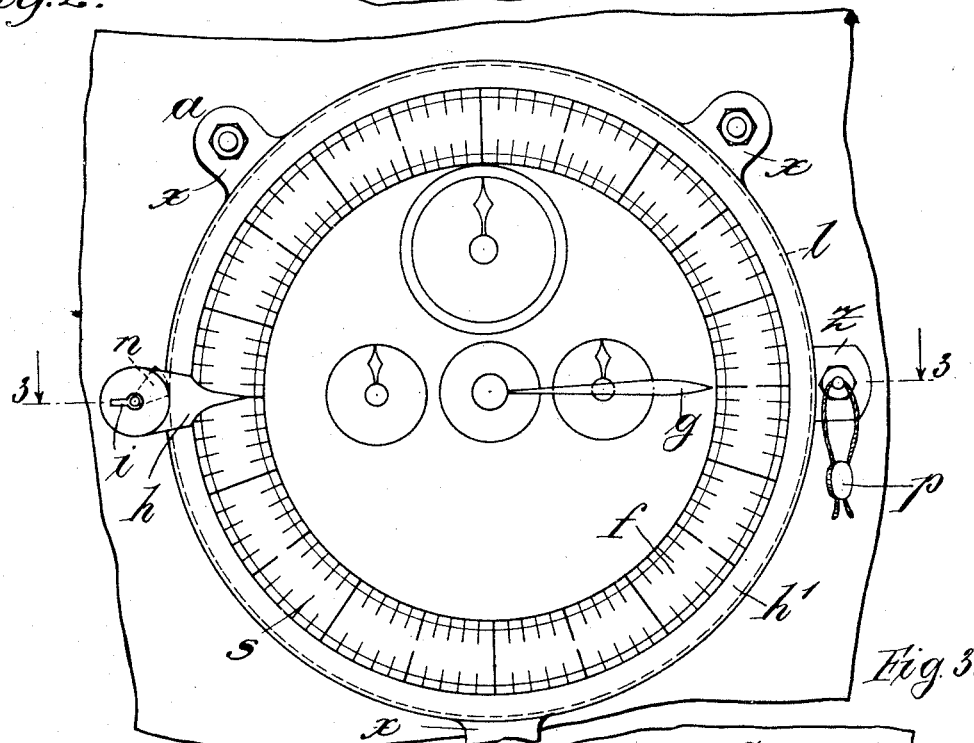
Figure 3:
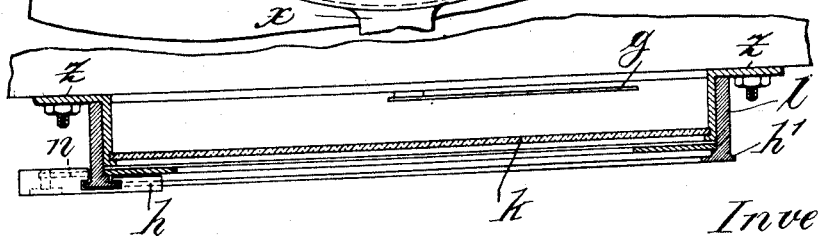

In the drawing: Figure 1 represents in front view a gas meter provided with a unit and a value scale together with an external indicator embodying in desirable form the present improvements. Fig. 2 is an enlarged view of the indicator scale and Fig. 3 is a section through the scale casing on line 3—3 of Fig. 2.

Similar characters of reference denote like parts in all the figures.

In carrying the invention into effect according to the form illustrated, the meter $a$ is provided with an inner scale $f$ and a corresponding pointer $g$. The inner scale may represent units of gas as for instance cubic feet while an outer scale $s$ is so graduated that it represents the money value of the gas consumed during a certain interval of time. The inner scale and pointer $g$ are inclosed in a casing having a glass face $k$. This casing is usually sealed by any convenient form of seal such as a cord having its end sealed with a lead wafer $p$. It is self-evident that the casing can not be opened without breaking the seal $p$. In order to enable the customer to determine the value of the gas used during any period of time an external pointer $h$ is provided which is adapted to ride on a ledge $h^1$ located on the casing $l$ of the outer scale $s$. This pointer $h$ may be clamped in any desired position by inserting a suitable key in the key opening $i$, the key being adapted to turn a segment $n$ and jam it against the side of the ledge $h^1$. If desired the segment $n$ and the ledge $h^1$ may be milled or any other suitable means may be employed to securely clamp the indicator or pointer $h$. It is plainly seen that only one in possession of the key fitting that particular key hole $i$ may set the indicator or pointer $h$ and this adjustment is effected without breaking the lead seal and interfering with the standardized mechanism inside of the meter.

In order to fully explain the purpose of this invention the important points are shortly recited. The meter for gas indicating cubic feet of gas or an electric meter indicating kilowatts or the like is made in the works and then standardized by the authorities, producers or both and provided with the lead seal in the usual manner. Assuming that the price of gas or electricity is different in different cities then the novel device for controlling the consumption and value of a certain number of units during a certain period of time is attached to the meter without disturbing or interfering with the standardized mechanism with such value scales as will give the value in particular cities. Thus the improvement is applicable to any kind of standardized meters because the particular value of scales giving the proper value in certain cities may be thereto attached and operated or set solely by one who is in possession of the key fitting the particular key hole of the device.

As shown on the drawing the pointer $g$ extends onto the volume scale and the pointer $h$ is adjusted in accordance therewith and secured.

The casing of the value scale may be attached in any suitable manner, such for instance, as by means of lugs $x$ bolted to the casing of the meter, as shown in Fig. 2. The mechanism of the meter is secured in position by means of lugs $z$, Figs. 2 and 3, said lugs being bolted to the casing of the meter and sealed in the usual manner by means of cords and lead-seals $p$.

It will be understood from the above that certain details of the invention may be changed to suit the various kinds of meters without departing from the spirit and principle of this invention.

I claim:

1. The combination with a gas, electricity or other like meter comprising a sealed mechanism for indicating the number of units consumed, of means for ascertaining the local value of the consumption during a certain period of time comprising an outer local value scale mounted thereon without tampering with the sealed mechanism, an adjustable pointer adapted to register with said scale and adjustable relatively to the sealed indicator and a key locking device for locking said pointer in position.

2. The combination with a gas, electricity or like meter comprising a sealed mechanism for indicating the number of units consumed, of means for ascertaining the local value of the consumption during a certain period of time comprising an outer local value scale mounted thereon without tampering with the sealed mechanism, a ledge surrounding said local value scale, an adjustable pointer adapted to be movable on said ledge and to register with said scale, said pointer being adjustable relatively to the sealed indicator, and a key locking device for locking said pointer in position on the ledge.

3. The combination with a gas, electricity or like meter comprising a sealed mechanism for indicating the number of units consumed, of means for ascertaining the local value of the consumption during a certain period of time comprising an outer local value scale, mounted thereon without tampering with the sealed mechanism, a ledge surrounding said local value scale an adjustable pointer adapted to be movable on said ledge and to register with said scale, said pointer being adjustable relatively to the sealed indicator, and a key operated cam carried by said pointer and adapted to engage said ledge, said cam being adapted in one position to enable said pointer to be moved on said ledge and in another position to clamp the pointer in position on the ledge.

In witness whereof I have hereunto set my hand in the presence of two witnesses.

ADOLPH FRANK.

Witnesses:
WOLDEMAR HAUPT,
HENRY HASPER.